United States Patent [19]

Zimmern

[11] 3,932,077

[45] Jan. 13, 1976

[54] ROTARY INTERENGAGING WORM AND WORM WHEEL WITH SPECIFIC TOOTH SHAPE

[76] Inventor: Bernard Zimmern, 27, rue Delabordere, Neuilly-sur-Seine (Hauts de Seine), France, 92200

[22] Filed: Sept. 18, 1974

[21] Appl. No.: 507,052

Related U.S. Application Data

[63] Continuation of Ser. No. 341,791, March 15, 1973, abandoned.

[52] U.S. Cl. .............................................. 418/195
[51] Int. Cl.² ...................... F01C 1/08; F04C 17/04
[58] Field of Search ..................... 418/195; 74/458

[56] References Cited
UNITED STATES PATENTS

| | | | |
|---|---|---|---|
| 1,791,047 | 2/1931 | Symons | 418/195 |
| 2,471,813 | 5/1949 | Cousino | 418/195 |
| 3,180,565 | 4/1965 | Zimmern | 418/195 |
| 3,536,425 | 10/1970 | Cancrinus | 418/195 |
| 3,551,082 | 12/1970 | Zimmern | 418/195 |

Primary Examiner—John J. Vrablik
Attorney, Agent, or Firm—Lane, Aitken, Dunner & Ziems

[57] ABSTRACT

The crest of a projecting helical thread formed on a rotor is located on a surface of revolution with respect to the rotor axis and cooperates in a fluid-tight manner with a stationary casing which surrounds the rotor. At least one toothed sealing wheel is engaged with the rotor thread so as to rotate about a transverse axis with respect to the rotor axis and one face of each tooth which is in mesh with the thread is exposed to the high-pressure fluid. The portions of each tooth-flank which are adjacent to said face are portions of surface of revolution and include those zones of the flanks which come into contact with the thread during rotational motion.

7 Claims, 20 Drawing Figures

Fig. 20 to the high-pressure fluid are portions of surfaces of revolution, and that said portions of flanks include those zones of the flanks which come into contact with the thread during the movement of rotation of the rotor.

Thus the contacts between the thread of the rotor and the flanks of the worm-wheel teeth take place tangentially to a surface of revolution instead of being made along an edge. Any risk of wear and consequently of leakage are considerably reduced. It will be seen in addition that this structure makes it possible to machine the rotor threads by means of tools which rotate about their own axes and which can consequently be grinding tools.

The surfaces of revolution aforesaid can be cylindrical and their axes can be inclined with respect to a plane at right angles to the axis of rotation of the sealing worm-wheel.

In a preferred embodiment of the invention, the surfaces of revolution aforesaid are conical and the axes of the conical surfaces relative to the two flanks of any one tooth are substantially perpendicular to the axis of rotation of the sealing worm-wheel and intersect said axis of rotation at two different points, the directions of the axes of said two conical surfaces being inclined with respect to each other.

Further properties and advantages of the invention will become apparent from the following description, a number of embodiments of the invention being illustrated by way of non-limitative example in the accompanying drawings, apart from FIGS. 1 to 3 which were mentioned earlier and relate to the state of the prior art.

Figure 1:
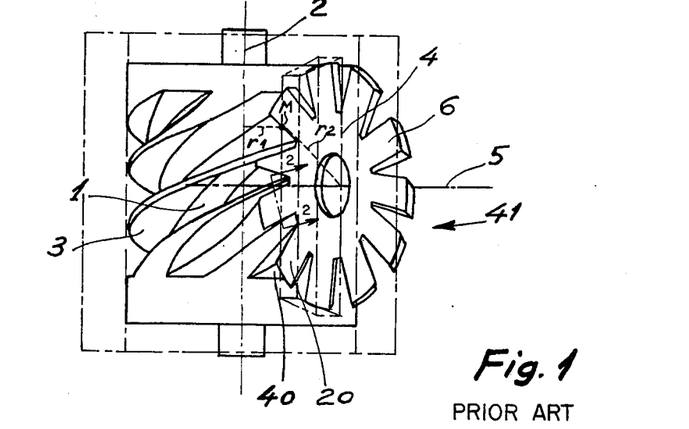
FIG. 1 is a perspective view of a prior art construction of an interengaging rotor and a sealing worm-wheel.
Figure 4:
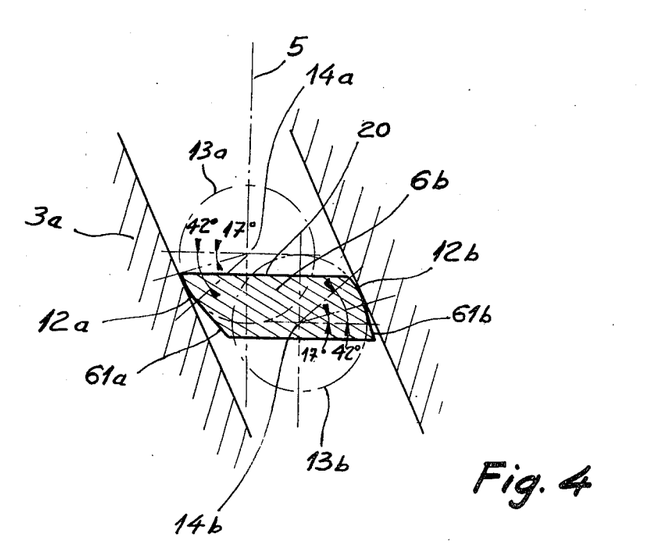
FIG. 4 is a sectional view of a first form of construction of a sealing worm-wheel tooth in accordance with the invention.

There is shown in FIG. 4 a sectional view of a tooth 6b of a sealing worm-wheel such as the wheel 4 which is illustrated in FIG. 1 as hereinbefore described.

The portions 12a and 12b of the tooth flanks which are adjacent to the face 20 of that tooth which is exposed to the high-pressure fluid are constituted by portions of surfaces of revolution having axes 14a and 14b.

In each section of the tooth, the tooth profiles therefore have portions constituted by circular arcs such as those designated by the references 13a and 13b which are parallel to the surfaces of revolution aforesaid. The radii of the circles 13a and 13b which terminate at the end points of said circular arcs make with a perpendicular to the axis of rotation 5 of the worm-wheel angles which are in one case equal at a maximum to the minimum value of the angle of slope A of the threads as hereinbefore defined and in the other case equal at a minimum to the maximum value of said angle A.

Thus in the example described earlier with reference to FIG. 3, said angles will in one case be equal to a maximum of 27° and in the other case be equal to a minimum of 42°.

Figure 3:
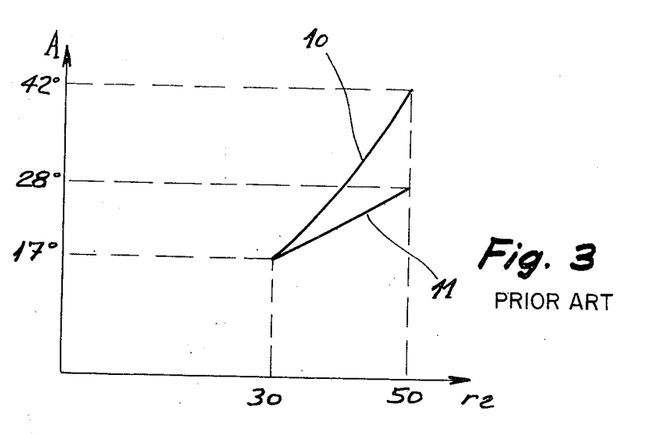
FIG. 3 is a plot at the contact point of the rotor and sealing worm-wheel of the slope angle of the rotor thread versus the distance from the axis of rotation of the sealing worm-wheel.

Each thread-flank is extended beyond the portion of revolution by zones 61a and 61b which are, for example, portions of planes tangent to the surfaces 12a and 12b and the slopes of which are respectively higher than the maximum slopes and lower than the minimum slopes as defined in FIG. 3. Said extensions are located on the side of the tooth which is exposed to the low pressure.

Figure 5:
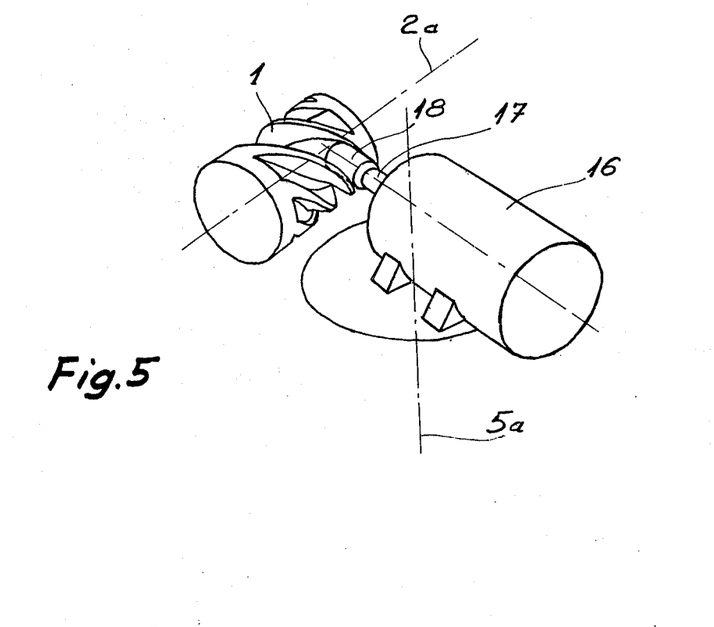
FIG. 5 is a perspective view of a device for machining a rotor in accordance with the invention.

FIG. 5 shows diagrammatically a device for machining the threads of the rotor such as the globoidal worm of FIG. 1 in order that said threads should be compatible with the tooth profile shown in FIG. 4.

The rotor 1 is mounted to rotate about its axis 2a. In addition, an electric motor 16 is mounted to rotate about an axis 5a which takes up the same position with respect to the rotor 1 as the axis 5 of the sealing worm-wheel. A tool 18 is mounted on the shaft 17 of said motor. The screw threads may already have been rough-formed by casting; the shafts having axes 2a and 5a are synchronized in rotation by means of suitable devices in order to rotate at speeds which are in the same ratio as the operating speeds of the rotor and the sealing worm-wheel, that is to say 11 to 6 in the example mentioned above.

The tool itself consists either of a milling-cutter or of a double blade or of a grinding-wheel having an external diameter which corresponds to that of the circles 13a and 13b.

In an initial pass, the motor shaft 17 coincides with the axis 14a (shown in FIG. 4). A thread flank such as 3a (shown in FIG. 3) is generated; a divider which is fixed on the shaft having an axis 2a makes it possible with the tool located outside the rotor to index this latter in a second position and to machine the flank 3a of a second thread and so forth.

ROTARY INTERENGAGING WORM AND WORM WHEEL WITH SPECIFIC TOOTH SHAPE

This is a continuation of application Ser. No. 341,791 filed Mar. 15, 1973 now abandoned.

This invention relates to rotating fluid-compression or expansion machines of the type comprising a rotor provided with at least one helical thread which is disposed in meshing engagement with the teeth of a rotary sealing worm-wheel.

Machines of this type are already known and have been disclosed in particular in French Pat. No. 1,287,593, 1,331,998, 1,586,832 and 1,601,531. By way of example, the last-mentioned patent describes a machine which is illustrated diagrammatically in FIG. 1 of the accompanying drawings and comprises a rotor 1 constituted by a globoidal worm which is mounted to rotate about an axis 2 and provided with a plurality of helical threads 3. The crests of the threads 3 are disposed on a cylindrical surface which is symmetrical with respect to the axis 2 and cooperate with a casing which has not been illustrated. The threads 3 are in mesh with the teeth 6 of a sealing worm-wheel 4 and this latter is mounted to rotate about an axis 5 which, in this example, is substantially at right angles to the axis 2 of the rotor.

The teeth 6 of the sealing worm-wheel delimit with the threads 3 of the rotor compression or expansion chambers which are successively put into communication with a port for the high-pressure fluid, said port being provided in that region of the casing which is located in the vicinity of the sealing worm-wheel and designated by the reference numeral 40. The reference numeral 20 designates that face of each tooth 6 which is exposed to the high-pressure fluid.

During rotation of the sealing worm-wheel, a predetermined point such as M which is located on one flank of a tooth 6 is brought successively into contact with points of a thread 3 at which said thread is inclined at a variable angle of slope with respect to the plane of rotation of the sealing worm-wheel. In the case which is illustrated in FIG. 1, this angle of slope A is given substantially by the formula $\operatorname{tg} A = n_1 r_2 / n_2 r_1$ where $n_1$ designates the number of threads of the rotor, $n_2$ designates the number of teeth of the worm-wheel and $r_1$ and $r_2$ represent the distances from the point M respectively to the axis 2 of rotation of the rotor and to the axis 5 of rotation of the worm-wheel.

In the case of a predetermined point M of a tooth 6 corresponding to a given value of $r_2$, the angle A is therefore of minimum value when M is in contact with a point in the vicinity of the thread crest and of maximum value when M is located in the position nearest the root of the thread.

These minimum and maximum values depend on the value of $r_2$, that is to say on the position of the point M on the flank of the tooth as shown in FIG. 3 of the accompanying drawings.

In this figure, $r_2$ is expressed as a percentage of the diameter of the rotor.

In the case of a machine of the type shown in FIG. 1 in which the rotor and sealing worm-wheel have a diameter D, the rotor has six threads, the sealing worm-wheel has eleven teeth, and the distance between the axes of rotation 2 and 5 is equal to 0.8 D, it is apparent from FIG. 3 that the angle A varies substantially between 28 and 42 degrees in respect of a point M which is located at the tip of a tooth ($r_2 = 50$). When the point M is located nearer the root of the tooth, the maximum values (curve 10) and minimum values (curve 11) of A come closer to each other so as to coincide at a value of the order of 17 degrees when the point M is at a distance of 0.3 D from the axis of the sealing worm-wheel. In the position last mentioned, the point M comes into contact only with those points of the thread which are located in the vicinity of the crest.

When the external profile of the rotor is not cylindrical or when the arrangement of the worm-wheel teeth is different from that shown in FIG. 1, the law of variation in the angle A no longer corresponds to the formula given above or to the curves 10 and 11 of FIG. 3 but the angle A is always comprised between a maximum value and a minimum value as represented by curves which are similar to the curves 10 and 11.

The aforesaid variations in the angle A set limitations on the profile of the flanks of the worm-wheel teeth 6 which must come into substantially fluid-tight contact with the threads 3 of the rotor.

Figure 2:
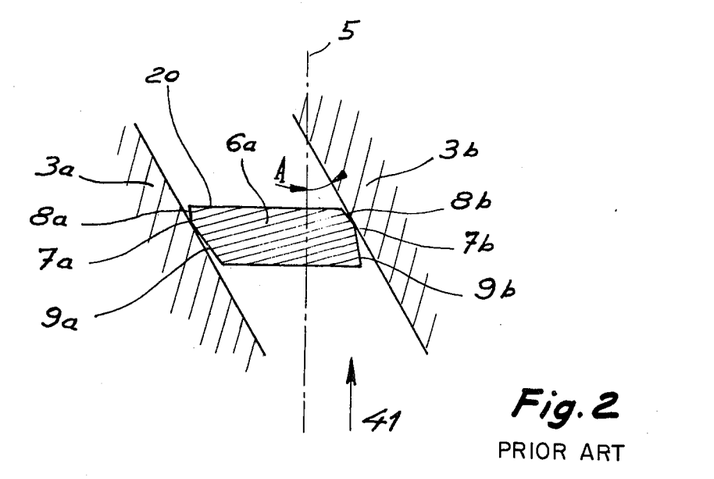
FIG. 2 is a sectional view of the sealing worm-wheel shown in FIG. 1.

In machines of known types, the flanks of the worm-wheel teeth have two surfaces which intersect along an edge. In FIG. 2 of the accompanying drawings, the sectional view which is taken along line X—X' of FIG. 1 shows a tooth 6a in contact with threads 3a and 3b of the rotor. It is apparent that the flanks of the tooth have two surfaces as designated on the one hand by the references 8a and 9a and on the other hand by the references 8b and 9b and that said surfaces intersect along edges 7a and 7b. The portions 8a and 9b are inclined to the axis of rotation 5 of the sealing worm-wheel at an angle which is equal to the minimum value of the angle A in respect of the value of $r_2$ which corresponds to the tooth-section considered whilst the portions 8b and 9a are inclined to the axis 5 at an angle which is equal to the maximum value of A.

This known technique is subject to a number of disadvantages.

On the one hand, the contact edges are delicate and liable to sustain damage as a result of friction, play thus develops between the flanks of the teeth and the threads, which in turn results in leakage of the fluid to be compressed or expanded and in reduced efficiency of the machine.

Furthermore, machining of the rotor threads can be carried out in accordance with British Pat. No. 649,412 only by means of a tool which does not rotate about its own axis and this prevents the possibility of machining by grinding as well as the use of materials which have a high degree of hardness. This results in a lower standard of precision in machining and lower quality of the state of surface of rotor threads than is achieved by the grinding process.

The primary object of the invention is to overcome the disadvantages mentioned in the foregoing.

In accordance with the invention, the machine for the compression or expansion of a fluid comprising a rotor mounted for rotation about an axis and provided with at least one thread disposed in a helix and forming a projection, the crest of said thread being disposed on a surface of revolution with respect to the axis of the rotor and so arranged as to cooperate in substantially fluid-tight manner with a stationary casing which surrounds the rotor at least to a partial extent, at least one sealing worm-wheel mounted to rotate about an axis which is located transversely with respect to the axis of the rotor and provided with teeth in meshing relation with the rotor thread, one face of each aforesaid tooth in meshing relation with the rotor thread being exposed to the high-pressure fluid, is characterized in that the portions of each tooth-flank of the sealing worm-wheel which are adjacent to that tooth-face which is exposed When the same flank of all the threads has been machined, the shaft 17 is displaced so as to bring this latter into coincidence with the position to be occupied by the center 14b and the flanks 3b are machined in the same manner. It is clearly possible to arrange a number of tools simultaneously so that one, for example, performs the machining of the flank 3a while the other machines the flank 3b, provision being also made for a number of machining devices such as 5a, 17, 18 which operate simultaneously.

Figure 8:
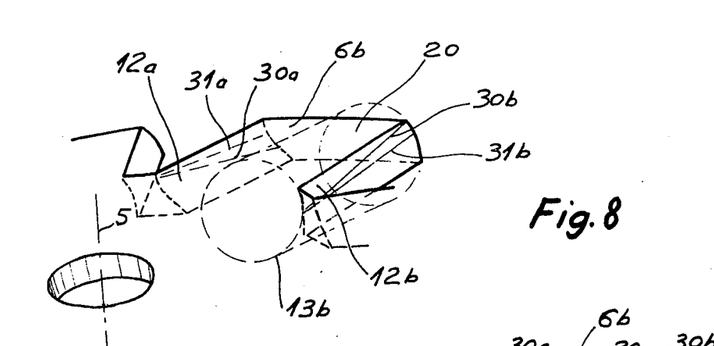
FIG. 8 is a perspective view of the tooth shown in FIG. 4.

FIG. 8 shows in perspective a partial view of a sealing worm-wheel in accordance with the invention and especially a tooth 6b, the flanks of which are cut partly on cylindrical surfaces of revolution such as the surface 13b; this view corresponds to the cross-section of FIG. 4.

On the flanks 12a and 12b are shown lines 30a, 30b, 31a and 31b which represent the end positions at which the points of contact between the flanks of the tooth and the threads are located on said flanks. Such contacts can occur only at points located respectively between the lines 30a and 31a, and between the lines 30b and 31b. Said lines correspond to the extreme values of slopes which were described earlier with reference to FIG. 3; the lines 30a and 30b correspond to the slopes of curve 10 of FIG. 3 and the lines 31a and 31b correspond to the slopes of curve 11 of said figure.

The planes containing the faces of the sealing worm-wheel cut in the cylinders such as 13b sectors of sufficient width to completely encompass the lines aforesaid in such a manner as to ensure that the contacts between threads and tooth flanks appear as surface-to-surface contacts and not surface-to-edge contacts. Finally and above all, it will be noted that the contact zones formed respectively between the lines 30a and 31a, and 30b and 31b have been brought as close as possible to the face 20 of that tooth which is exposed to the high pressure and are located in its vicinity.

Figure 6:
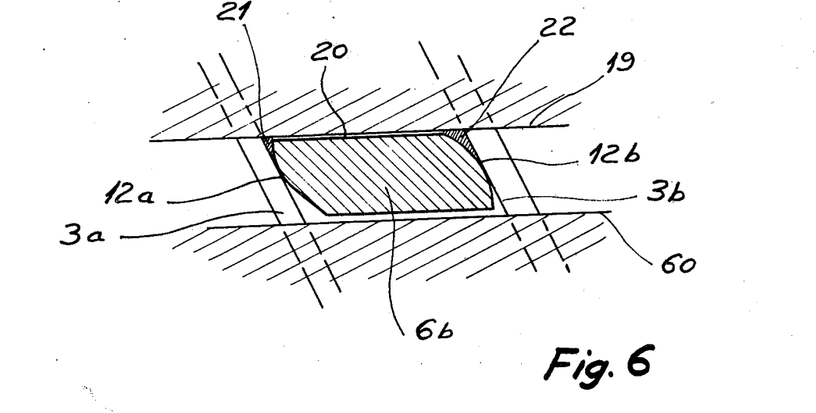
FIG. 6 is a sectional view of the tooth shown in FIG. 4, this view being taken at the level of the periphery of the rotor.

However, the replacement of a thread-tooth contact along edges such as 7a and 7b of FIG. 2 by the contacts described in FIG. 4 introduces a source of leakage, the cause of which can readily be understood by referring to FIG. 6 in which a cross-section has been taken parallel to the axis of the sealing worm-wheel at the level of the periphery of the rotor and therefore of the casing which surrounds said rotor.

Said casing is provided with a passage for the worm-wheel which is a slit in the case of a flat worm-wheel, the lips 19 and 60 of said slit being shown in the figure.

One of said lips, namely the lip 19 which is located on that side of the sealing worm-wheel to which the high pressure is applied, is placed in fluid-tight contact with that face 20 of the worm-wheel which is exposed to said high pressure in such a manner as to limit leakages between the planes 19 and 20. However, a shaded zone 22 exists between the thread 3b, the flank 12b of the tooth and the lip 19 and, similarly, a shaded zone 21 exists between the thread 3a, the flank 12a and the lip 19. The high-pressure fluid is capable of escaping through said zones towards the low-pressure side in the direction of the arrow 23 of FIG. 7, in which is shown in perspective a tooth 6b cooperating on one flank with the thread 3b, a second tooth 6c, the lip 19 shown in a chain-dotted line, and the passage 22.

Figure 7:
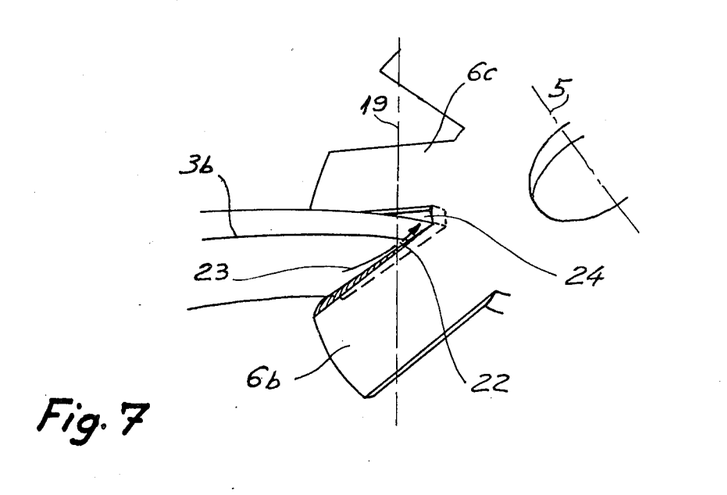
FIG. 7 is a perspective view showing the meshing engagement of a rotor thread with the tooth of FIG. 4.

Provision is actually made between the teeth 6b and 6c for a volume 24 which is not filled by the thread 3b and is in fact filled to an even lesser extent as the thread 3b is of smaller height, which is the case towards the end of the worm and especially the high-pressure end or in other words the zone 40 as shown in FIG. 1.

This phenomenon is all the more important by virtue of the fact that the generating-line of the surfaces of revolution adopted for the exterior of the rotor is a straight line in order to increase the compression ratio in the case of compressors or gas expansion machines as described in French Pat. No. 1,331,998. Under these conditions, the volume 24 is at a maximum when only the end portion of the tooth is in mesh with the thread and the pressure within the chamber formed by the thread is of maximum value in this position.

In point of fact, the volume 24 communicates freely with the volume formed between the tooth and the lip 60 of FIG. 6 which in turn communicates with all the low-pressure zones of the machine.

In consequence, these machines can operate only if the leakage zones 21 and 22 are either non-existent or have negligible surface areas since considerable leakage would otherwise develop between the high-pressure side and low-pressure side.

In the arrangements adopted in the prior art as shown by way of example in FIG. 2, it was possible to reduce the cross-sectional area of the passages aforesaid by bringing the contact lines 7a and 7b closer to that face 20 of the tooth which is subjected to the high pressure and in an extreme case to reduce these cross-sectional areas to zero.

With the present invention, it is impossible to suppress these areas since the contact line is no longer located on a stationary edge but is subject to displacement within a zone.

However, it is possible to obtain sufficiently small cross-sectional areas 21 and 22 to ensure that leakages are negligible at high pressures of the order of 7 to 15 bars which are commonly employed in industry. While those portions of the tooth flanks which are disposed on surfaces of revolution are given a maximum diameter which approximates to the width between two adjacent threads, it is necessary to dispose the contact zones between each tooth flank and the threads in the vicinity of the tooth face 20 which is exposed to the high pressure. This would not be possible if both flanks of any one tooth were disposed on the same surface of revolution.

Thus, in the aforementioned example of a rotor with six threads having a diameter D and disposed in meshing relation with a sealing worm-wheel with eleven teeth having a diameter D, wherein the distance between the axes of rotation of the rotor and of the worm-wheel is equal to 0.8 D and the widths of the teeth do not exceed 0.18 D, those portions of the tooth flanks which are disposed on surfaces of revolution can be given a diameter of the order of 0.12 D. Under these conditions, the leakage zones 21 and 22 in the case of each tooth have a total surface area such that the maximum value does not, however, exceed $0.4 \times 10^{-4} D^2$.

Figure 9:
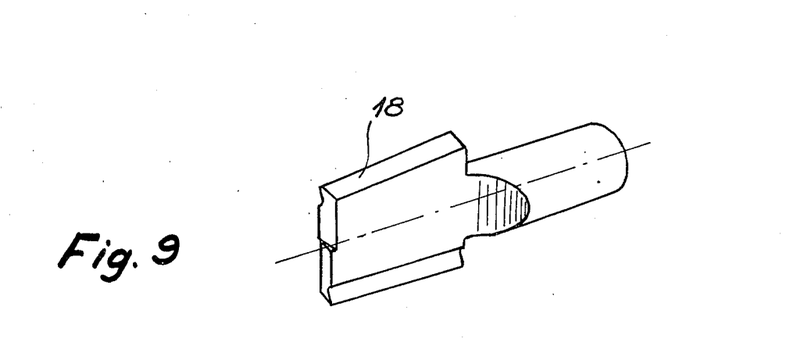
FIG. 9 is a perspective view of a tool employed for machining a rotor in accordance with a second embodiment of the invention.
Figure 10:
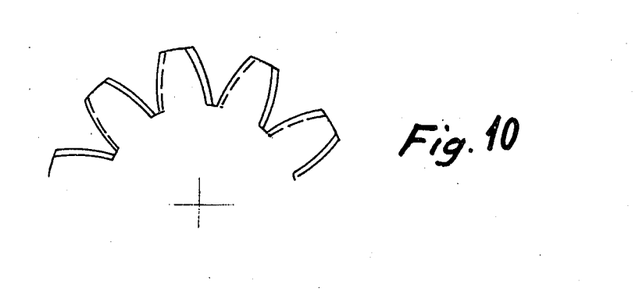
FIG. 10 is a partial view of a second form of construction of a sealing worm-wheel.

In order to form the threads, it is also possible to employ a tool which is not cylindrical but has a smaller diameter at the tip than at the base and to give the teeth of the sealing worm-wheel the shape which is shown in FIG. 10. A tool 18 of this type is illustrated in FIG. 9. By this means, it is possible to ensure that the portions 12a and 12b of the tooth flanks (shown in FIGS. 4 and 6) have smaller diameters in the vicinity of the tooth crests and consequently to reduce the surface areas of the leakage zones 21 and 22 in the vicinity of said crests. In point of fact, the most substantial leakages occur at the high-pressure end of the rotor when the tooth is partly disengaged from the thread and cooperates with this latter only at the tip of said tooth. The reduction of the leakage zones towards the tooth crests therefore produces important effects.

Figure 12:
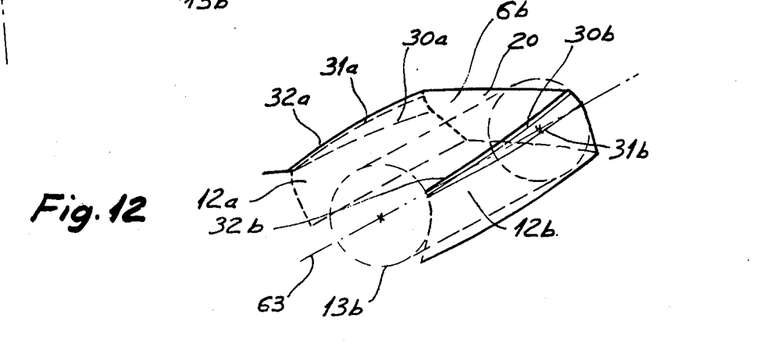
FIG. 12 is a perspective view of a third form of construction of a worm-wheel tooth.

In a preferred alternative embodiment of the invention, FIG. 12 shows a worm-wheel tooth 6b, that face of said tooth which is exposed to the high-pressure fluid being designated by the reference numeral 20.

Figure 11:
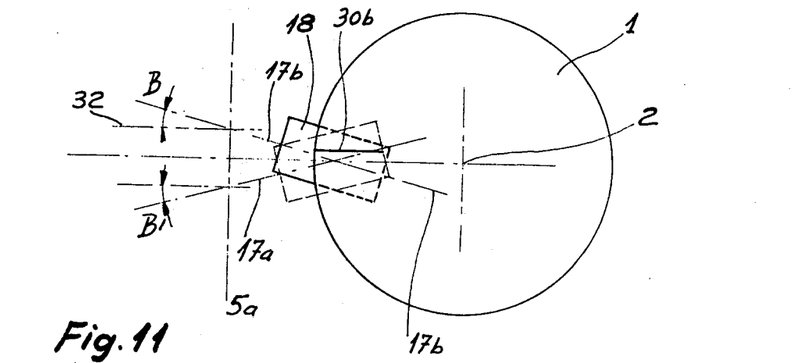
FIG. 11 is a diagrammatic view of a manufacturing device for a third embodiment of the invention.

One flank of the tooth 6b comprises a portion 12b disposed on a cylindrical surface of revolution 13b, the axis 63 of which makes a small angle B with the face 20. Similarly, the other flank of the tooth has a portion 12a of a cylindrical surface of revolution, the axis of which (not shown) makes an angle B' with the face 20. Because of the perspective illustration of FIG. 12, the angles B and B' are not illustrated therein but the magnitude of these angles is represented in FIG. 11 by identically referenced angles B and B'. The intersections of the tooth face 20 with the cylindrical surfaces 12a and 12b are therefore elliptical arcs 32a and 32b.

As a result of the inclination of the face 20 with respect to the axes of the surfaces 12a and 12b, the end contact lines 30b and 31a between the tooth flanks and the rotor threads practically coincide with the elliptical edges of the tooth 32a and 32b.

FIG. 11 shows the position of the tool employed for forming the rotor threads which are intended to come into mesh with teeth of the type shown in FIG. 12. As in the device described with reference to FIG. 5, said tool 18 is driven in rotation by a motor which is in turn rotatably mounted with respect to an axis 5a which coincides with the axis of rotation of the sealing worm-wheel.

The tool 18 is substantially cylindrical and is shown in full lines in the position in which the thread flank is formed by the tool for subsequent cooperation with the tooth flank 12b, and in which said thread flank is inclined at a maximum angle A with respect to the sealing worm-wheel. The axis 17b of the tool is then substantially perpendicular to the axis 2 of rotation of the rotor and makes with a perpendicular to the axis 5a an angle equal to B. It has been found that, under these conditions, the end contact line 30b between the tooth flank 12b and the thread is substantially in a plane located at right angles to the axis 5a, that is to say parallel to the face 20 of each worm-wheel tooth.

When the tool 18 is in the position shown in chain-dotted lines so as to form the thread flank which is intended to cooperate with the flank 12a of the tooth 6b, the axis 17a of the tool is inclined at an angle B' with respect to a perpendicular to the axis 5a. Under these conditions, the end contact line 31a between the flank 12a of the tooth and the thread which corresponds to the minimum relative slopes of the thread (curve 11 of FIG. 3) is substantially in a plane at right angles to the axis 5a and therefore parallel to the face 20 of the tooth 6b. The position of the tool is adjusted along the axis 5a so that said plane should substantially coincide with the plane which contains the line 30b. In addition, the slit which is formed in the casing and through which the sealing worm-wheel is permitted to pass is located in a position such that the lip 19 of said slit which cooperates with the face 20 of the tooth which is exposed to the high-pressure fluid (FIG. 6) is located slightly beyond the plane which contains the lines 31a and 30b on that side on which the high pressure of the fluid is intended to be exerted.

This arrangement is particularly remarkable since it achieves a considerable reduction in the leakage cross-sections 21 and 22 shown in FIG. 6.

In fact, it is found that the leakage cross-section 21 has been reduced and could even be totally suppressed if the lines 31a and 32a were brought into coincident relation by displacing the face 20.

As to the leakage cross-section 22, this latter is very appreciably reduced. Thus, when the tooth is located at its maximum penetration in the rotor, said cross-section is of maximum value in the case of FIG. 8 in which the point of contact between the thread and the tooth flank on the periphery of the rotor is at a maximum distance from the face 20 whereas said cross-section can be zero in the case of FIG. 12.

In the numerical example which was given earlier, calculation shows that the mean value taken for the sum of the cross-sections 21 and 22 during rotation is reduced by a factor of about 7 and that these leakages then become completely negligible.

Instead of bringing back the lines 31a and 30b in a plane as explained in the case of FIG. 11, it is clearly possible to bring them back on a cone or in an extreme case, on a cylinder by suitably changing the angle B and correlatively the angle B'. This arrangement can therefore be applied to the machines described in French Pat. No. 1,586,832.

It is also possible to employ non-cylindrical shapes of tooth flanks which combine the progressive reduction in diameter towards the end of the tooth with the slopes which are shown in FIG. 11.

The foregoing arrangements can also be employed with rotors other than cylindrical rotors such as, for example, curved, conical or flat rotors of the type described in French Pat. Nos. 1,331,998 and 1,586,832.

It is also possible to make use of said arrangements with rotors having only one or two threads making several turns around the rotor as described in the prior art, especially in U.S. Pat. No. 2,716,861; in this case, the variations in the angle of slope are much smaller than those recorded in the example given in the present description, thereby readily permitting the construction of pumps or hydraulic motors with ground rotors having more accurate tolerances than would be possible in the case of machining by means of a tool. It is therefore possible to obtain pumps or hydraulic motors having small running clearances permitting delivery or utilization of high pressures without any substantial leakage.

Figure 13:
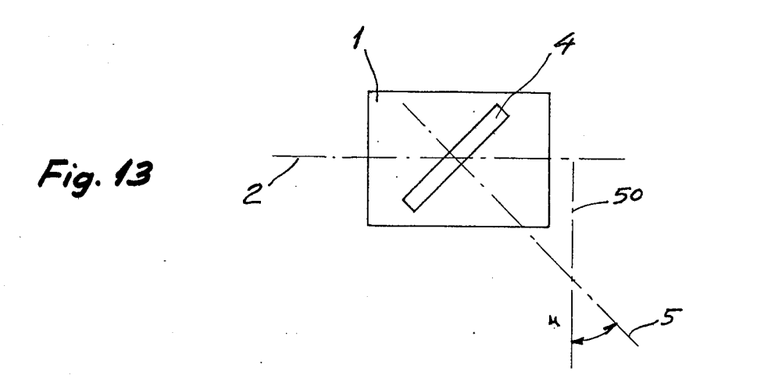
FIG. 13 is a diagrammatic view of a manufacturing device for a fourth embodiment of the invention.
Figure 14:
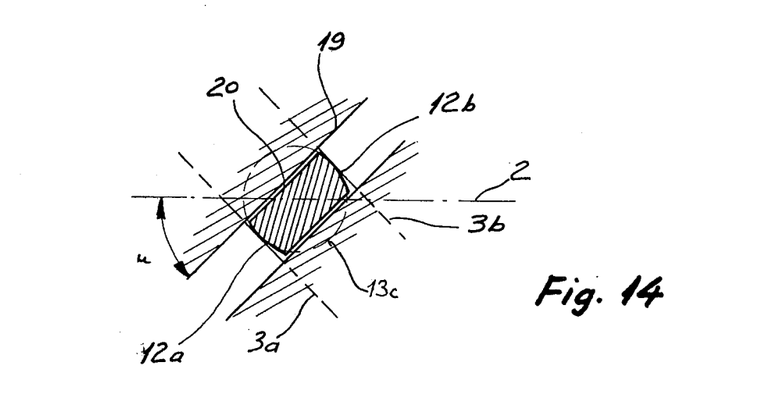
FIG. 14 is a sectional view of a fourth form of construction of a worm-wheel tooth.
Figure 15:
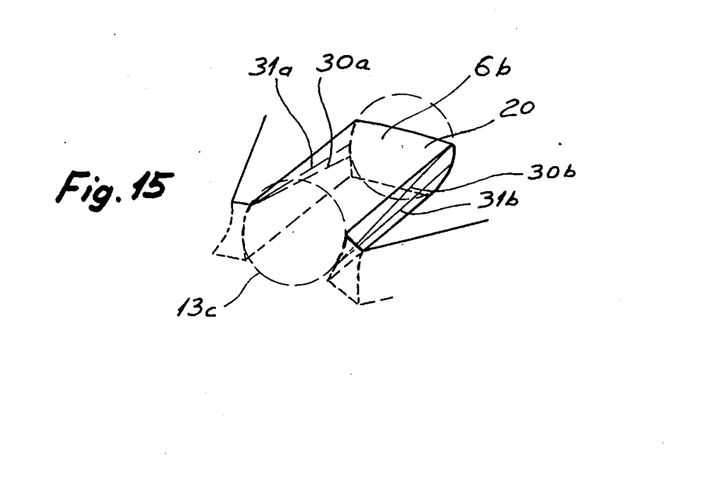
FIG. 15 is a perspective view of the tooth shown in FIG. 14.

A further embodiment of the present invention is illustrated in FIGS. 13, 14 and 15.

There is shown in FIG. 13 the rotor 1 and the sealing worm-wheel 4 which rotates about its axis 5.

The axis 5 is no longer perpendicular to the axis of rotation 2 of the rotor but is inclined with respect to this latter so as to make an angle $u$ with a plane 50 which is perpendicular to the axis of rotation 2.

The angle $u$ is chosen so as to have a value which is substantially the mean value of the angles of slope A of the threads. It is then possible to shape both flanks of any one tooth 6b (as shown in FIG. 15) on the same surface of revolution 13c while ensuring that the contact zones between tooth flanks and threads which are located respectively between the lines 30a, 31a and 30b, 31b are located in the immediate vicinity of that face 20 which is exposed to the high pressure.

Under these conditions, machining is greatly facilitated inasmuch as the two flanks of two adjacent threads can be machined simultaneously by the same tool without entailing any need to perform two successive operations or displacements of tools as indicated in the foregoing description with reference to FIG. 5.

It will be noted in FIG. 14 that the lip 19 of the casing which is in fluid-tight contact with the high-pressure face 20 of the sealing worm-wheel is no longer parallel to the axis 2 but is inclined with respect to said axis at an angle $u$.

Figure 20:
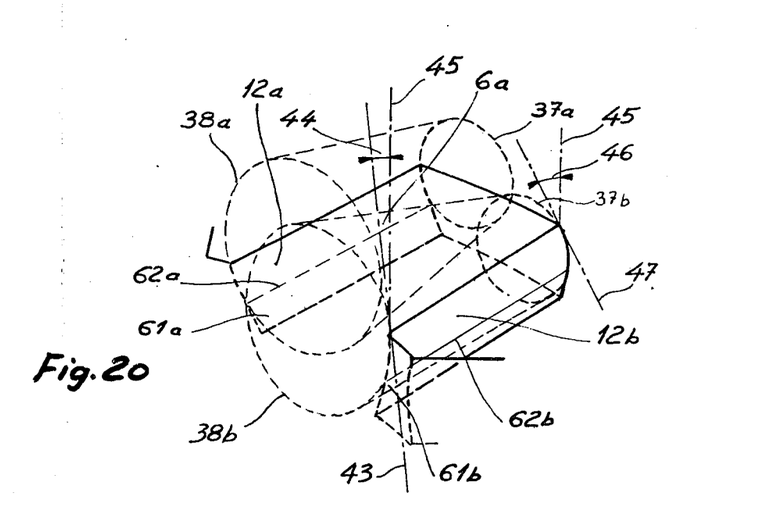
FIG. 20 is a perspective view of a fifth form of construction of a worm-wheel tooth.

FIG. 20 shows another form of construction of a worm-wheel tooth 6a in accordance with the invention.

The portions 12a and 12b of the tooth flanks adjacent to the face 20 which is exposed to the high-pressure fluid are portions of frusto-conical surfaces. There are shown in the figure the large bases 38a, 38b and the small bases 37a and 37b of said frusto-conical surfaces, the axes of which intersect the axis of rotation (not shown) of the sealing worm-wheel and are inclined with respect to each other.

The portions 12a and 12b of the flanks are extended by flat portions 61a and 61b which are joined to the frusto-conical portions 12a and 12b along lines 62a and 62b. The angle of inclination of the plane 61a with respect to the normal 45 to the tooth face 20 is at least equal to the maximum angle at which the thread is inclined to the sealing worm-wheel during rotation of this latter whilst the angle at which the plane 61b is inclined to said normal 45 is equal at a maximum to the minimum angle of inclination of the thread.

The tangents 43 and 47 to the circles 38b and 37b at the points of intersection thereof with the face 20 make angles 44 and 46 with the normal 45 to said face, the angle 44 being smaller than the angle 46. As a consequence, the end lines of contact between the flanks of the tooth and the threads have been brought nearer the face 20 of the tooth, compared with the embodiment of FIG. 8 in which said end contact lines were designated by the references 30b and 31b. The leakage zone 22 is consequently reduced.

Practically the same result as in the embodiment of FIG. 12 is therefore obtained but the machining of the rotor threads is simplified as will become apparent hereunder.

Figure 16:
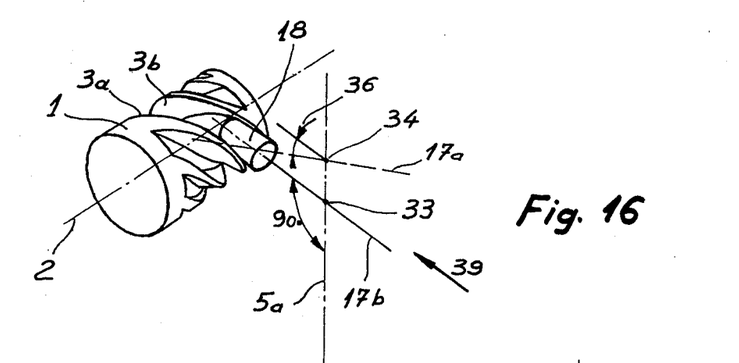
FIG. 16 is a diagrammatic view of a manufacturing device for a fifth embodiment of the invention.

FIG. 16 shows diagrammatically the device which is employed for the purpose of forming the rotor threads. As in the devices described in the foregoing, the rotor 1 is driven in rotation about its axis 2 and a tool 18 is driven in rotation about its axis by a motor (not shown), said motor being in turn driven in rotation about an axis 5a which coincides with the axis of the sealing worm-wheel.

Figure 19:
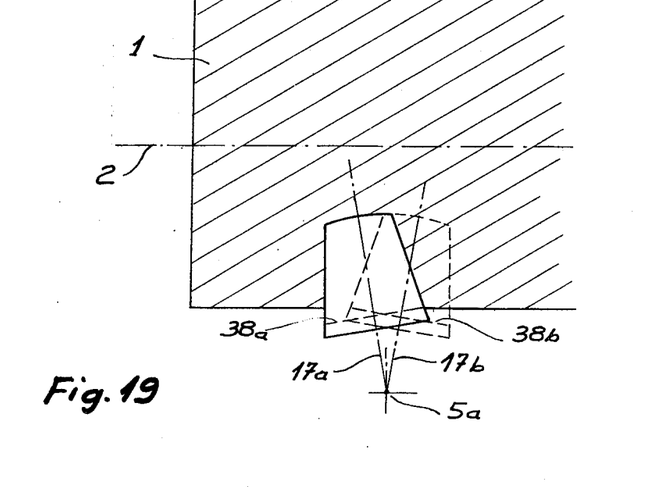
FIG. 19 is a sectional view to a larger scale along a diametral plane of the rotor of FIG. 16.

The axis of the tool 18 is brought either to 17a or to 17b according as the flanks 3a or 3b of the thread are to be formed. The axes 17a and 17b intersect the axis 5a at 34 and 33 respectively and are both perpendicular to the axis 5a. The axis 17a makes an angle 36 with a line parallel to the axis 17b. The two work positions of the tool 18 are visible especially in FIG. 19.

Figure 17:
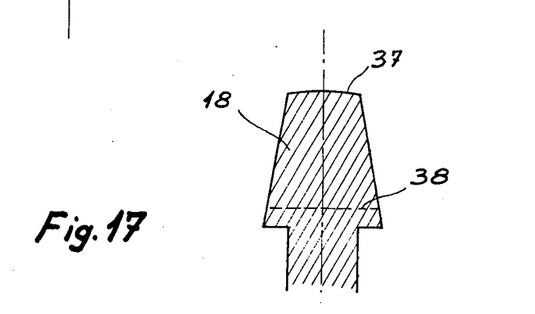
FIG. 17 is a sectional view of a tool of the device shown in FIG. 16.

The tool 18 (shown in FIG. 17) is of frusto-conical shape. The tip 37 of said tool can have different shapes and may be flat, for example, but is preferably constituted by the segment of a sphere, the diameter of the sphere from which said segment is cut being substantially equal to the diameter of the sealing worm-wheel, with the result that the center of the spherical segment 37 is located substantially on the axis 5a in the work position.

Figure 18:
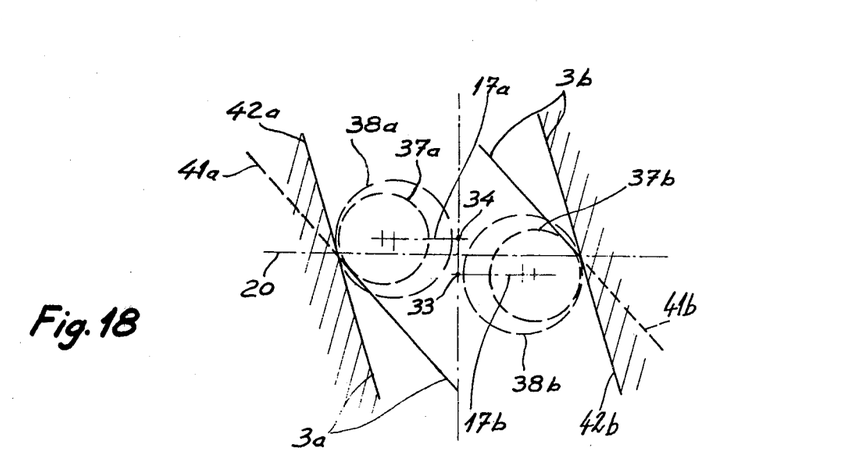
FIG. 18 is a part-sectional view in the direction of the arrow 39 of FIG. 16 and showing a fifth form of construction of a rotor.

FIG. 18 shows the circles 37a and 38b which are described by the tip 37 of the tool in its two positions, it being assumed that the axes 17a and 17b are substantially perpendicular to the axis of rotation 2 of the rotor, which corresponds to the positions of maximum penetration of the tool in the rotor. The circles 38a and 38b are the circles described on the tool by the points of contact between the tool and the external surface of the rotor. The trace of these circles is represented at 38 in FIG. 17.

In FIG. 18, the edges of the threads 3a and 3b which are located on the periphery of the rotor are represented at 42a and 42b and the limits of the bottom of the groove formed between the threads are designated by the references 41a and 41b.

Compared with the device shown in FIG. 11, the process of machining of the rotor is simplified. In fact, since the axes 17a and 17b are both perpendicular to the axis 5a, changeover from one position of the tool to the other is carried out by translational motion along the axis 5a followed by rotational motion about said axis and it is not necessary to incline the tool 18 with respect to the axis 17 of its drive motor.

Furthermore, the cross-section of the groove at the bottom of a thread along a diametral plane of the rotor which passes through the center of the sealing worm-wheel is a circular arc which is concentric with said worm-wheel. The crests of the worm-wheel teeth can therefore be given a circular profile which, during operation, remains in fluid-tight contact with the bottom of the groove formed between the threads.

What I claim is:

1. A machine for the compression or expansion of a fluid comprising a rotor mounted for rotation about an axis and provided with at least one thread disposed in a helix and forming a projection, the crest of said thread being disposed on a surface of revolution with respect to the axis of the rotor and so arranged as to cooperate with substantially fluid-tight manner with a stationary casing which surrounds the rotor at least to a partial extent, at least one sealing worm-wheel mounted to rotate about an axis which is located transversely with respect to the axis of the rotor and provided with teeth which advance into and out of root-crest meshing relation with the rotor thread within said housing thereby to establish a root-crest gap during movement of said teeth into and out of said housing, one face of each aforesaid tooth in meshing relation with the rotor thread being exposed to the high pressure fluid, wherein portions of each tooth-flank of the sealing worm-wheel are portions of surfaces of revolution, axes of which are distinct and generally parallel to said one tooth face which is exposed to the high pressure fluid, wherein said portions of flanks include those zones of the flanks which come into contact with the thread during the movement of rotation of the rotor, and wherein those zones are adjacent to the tooth-face which is exposed to the high-pressure fluid.

2. A machine according to claim 1, wherein the portions of each tooth-flank which are adjacent to that tooth-face which is exposed to the high-pressure fluid are portions of cylindrical surfaces.

3. A machine according to claim 2, wherein the diameters of the cylindrical surfaces aforesaid have a value approximately equal to or less than the distance between two adjacent threads.

4. A machine according to claim 2, wherein the axes of the cylindrical surfaces are slightly inclined with respect to that tooth-face which is exposed to the high-pressure fluid.

5. A machine according to claim 4, wherein the axes of the cylindrical surfaces relative to the two opposite flanks of any one tooth are inclined at a different angle with respect to that tooth-face which is exposed to the high pressure fluid.

6. A machine according to claim 1, wherein the portions of the tooth-flanks of the sealing worm-wheel which are adjacent to that tooth-face which is exposed to the high-pressure fluid are portions of conical surfaces.

7. A machine according to claim 6, wherein the axes of the conical surfaces relative to the two flanks of any one tooth are generally parallel to that tooth-face which is exposed to the high-pressure fluid and intersect the axis of rotation of the sealing worm-wheel at different points, the directions of the axes of said two conical surfaces being inclined with respect to each other.

* * * * *